(12) United States Patent
Forrest et al.

(10) Patent No.: US 9,383,025 B2
(45) Date of Patent: Jul. 5, 2016

(54) EXCESS FLOW VALVE WITH CAGE

(71) Applicant: BrassCraft Manufacturing Company, Novi, MI (US)

(72) Inventors: Earl David Forrest, Asheboro, NC (US); Nathaniel Faltin Dutton Schultz, Charlotte, NC (US); David C. Tisch, Ferndale, MI (US); Jesus R. Dominguez, Plymouth, MI (US)

(73) Assignee: Brasscraft Manufacturing Company, Novi, MI (US)

( * ) Notice: Subject to any disclaimer, the term of this patent is extended or adjusted under 35 U.S.C. 154(b) by 226 days.

(21) Appl. No.: 14/106,933

(22) Filed: Dec. 16, 2013

(65) Prior Publication Data

US 2015/0167858 A1    Jun. 18, 2015

(51) Int. Cl.
| F16K 31/02 | (2006.01) |
|---|---|
| F16K 17/28 | (2006.01) |
| F16K 47/04 | (2006.01) |
| F16K 31/08 | (2006.01) |

(52) U.S. Cl.
CPC .............. F16K 17/28 (2013.01); F16K 31/084 (2013.01); F16K 47/04 (2013.01); *Y10T 29/49412* (2015.01)

(58) Field of Classification Search
CPC ............................... F16K 31/084; F16K 17/28
USPC .............................. 137/517, 519, 460; 251/65
See application file for complete search history.

(56) References Cited

U.S. PATENT DOCUMENTS

| 123,098 | A | | 1/1872 | Goodale |
|---|---|---|---|---|
| 788,985 | A | | 5/1905 | Youtz |
| 1,364,147 | A | | 1/1921 | Spahr |
| 1,627,312 | A | | 5/1927 | Blust |
| 1,919,696 | A | * | 7/1933 | George ................... F16T 1/12 137/332 |
| 2,217,380 | A | | 10/1940 | Pedder et al. |
| 2,351,035 | A | | 6/1944 | Grant, Jr. et al. |
| 2,522,406 | A | | 9/1950 | Smith |
| 2,563,200 | A | | 8/1951 | Venning |
| 2,571,893 | A | | 10/1951 | Kendall |
| 2,699,799 | A | | 1/1955 | Wager |
| 2,702,052 | A | | 2/1955 | Grayson |
| 2,766,773 | A | | 10/1956 | Grayson |
| 2,775,363 | A | | 12/1956 | Taylor |
| 2,886,061 | A | | 5/1959 | Smith et al. |
| 2,899,981 | A | | 8/1959 | Binks |
| 2,918,083 | A | | 12/1959 | Clark, Jr. et al. |
| 2,936,779 | A | | 5/1960 | Kindred |
| 2,948,296 | A | | 8/1960 | Thorburn |
| 3,101,190 | A | | 8/1963 | Lindgren |
| 3,122,162 | A | | 2/1964 | Sands |
| 3,155,292 | A | | 11/1964 | Webster |

(Continued)

OTHER PUBLICATIONS

U.S. Appl. No. 13/647,542, filed Oct. 9, 2012.

(Continued)

*Primary Examiner* — Kevin Lee
*Assistant Examiner* — P. Macade Nichols

(57) ABSTRACT

An assembly for limiting excess flow includes a housing having an internal bore that defines a seat. A cage is positioned within the internal bore and includes an upstream end and a sealing surface at a downstream end. A back plate with at least one magnet is seated within the internal bore upstream of the cage. The cage moves away from the back plate when a predetermined flow condition is exceeded such that the sealing surface engages the seat.

26 Claims, 5 Drawing Sheets

(56) References Cited

U.S. PATENT DOCUMENTS

| | | | |
|---|---|---|---|
| 3,159,176 A | 12/1964 | Russell et al. | |
| 3,327,950 A | 6/1967 | Solomon | |
| 3,417,918 A | 12/1968 | Wallace | |
| 3,574,314 A | 4/1971 | Quercia | |
| 3,776,035 A | 12/1973 | Lofink | |
| 3,921,662 A | 11/1975 | Hauffee et al. | |
| 4,067,539 A | 1/1978 | Perl | |
| 4,177,831 A | 12/1979 | Benjamin | |
| 4,240,458 A | 12/1980 | Huff | |
| 4,280,523 A | 7/1981 | Norton | |
| 4,295,412 A | 10/1981 | Hachiro | |
| 4,345,428 A | 8/1982 | Cook | |
| 4,727,903 A | 3/1988 | Sturgis et al. | |
| 4,750,705 A * | 6/1988 | Zippe | F16K 31/003 137/248 |
| 4,811,756 A | 3/1989 | Hall | |
| 4,830,046 A | 5/1989 | Holt | |
| 4,874,012 A | 10/1989 | Velie | |
| 4,958,657 A | 9/1990 | Hagan et al. | |
| 5,010,916 A | 4/1991 | Albrecht | |
| 5,150,733 A | 9/1992 | Scaramucci | |
| 5,203,365 A | 4/1993 | Velie | |
| 5,215,114 A | 6/1993 | Breyer | |
| 5,280,806 A | 1/1994 | Glazebrook | |
| 5,293,898 A | 3/1994 | Masloff | |
| 5,465,751 A | 11/1995 | Newton | |
| 5,551,476 A | 9/1996 | McGinnis | |
| 5,582,201 A | 12/1996 | Lee et al. | |
| 5,613,518 A | 3/1997 | Rakieski | |
| 5,704,391 A | 1/1998 | McGowan, Jr. et al. | |
| 5,833,439 A | 11/1998 | Du | |
| 6,123,101 A | 9/2000 | Velie et al. | |
| 6,220,282 B1 | 4/2001 | Powell | |
| 6,427,711 B1 | 8/2002 | Kemp | |
| 6,889,707 B2 | 5/2005 | Nicolino | |
| 6,923,206 B2 | 8/2005 | Glover et al. | |
| 6,929,023 B2 | 8/2005 | Whitaker et al. | |
| 7,191,795 B2 | 3/2007 | Hettmann et al. | |
| 7,331,359 B2 | 2/2008 | Shay | |
| 7,533,689 B2 | 5/2009 | Goble | |
| 7,562,668 B2 | 7/2009 | Mackay-Smith et al. | |
| 7,654,283 B2 | 2/2010 | Seto et al. | |
| 7,814,931 B2 | 10/2010 | Newton et al. | |
| 7,984,727 B2 | 7/2011 | Southam | |
| 8,020,582 B2 | 9/2011 | Lea-Wilson et al. | |
| 8,047,224 B2 | 11/2011 | Eichler | |
| 2003/0000580 A1 | 1/2003 | Glover et al. | |
| 2008/0185047 A1 | 8/2008 | Eichler | |
| 2010/0108160 A1 | 5/2010 | Eichler | |
| 2013/0025724 A1 | 1/2013 | Grebinoski et al. | |

OTHER PUBLICATIONS

U.S. Appl. No. 13/647,612, filed Oct. 9, 2012.
International Search Report for PCT Application No. PCT/US2014/039884 mailed, Sep. 17, 2014.

* cited by examiner

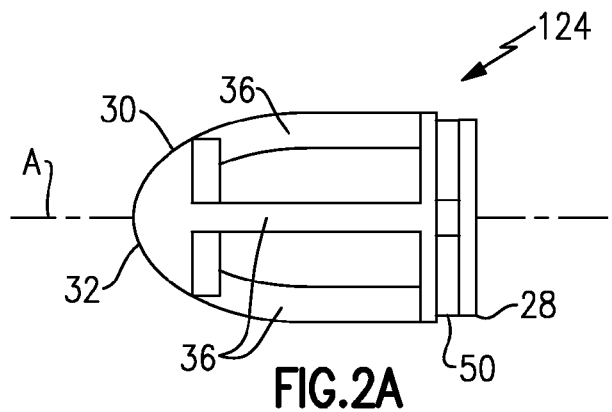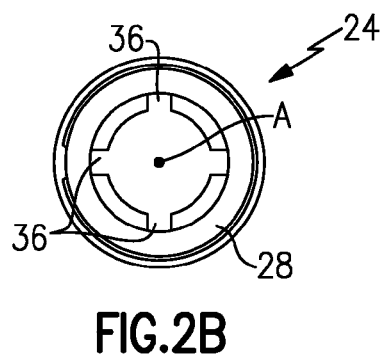
FIG.2A  FIG.2B
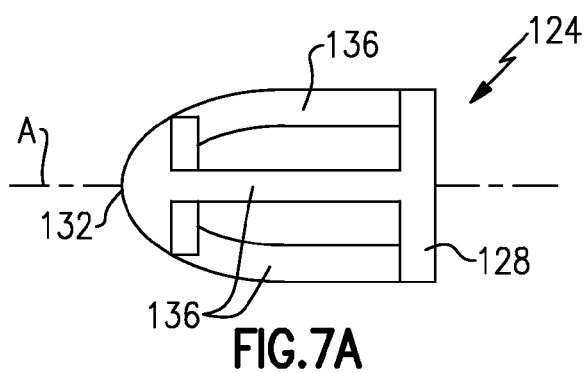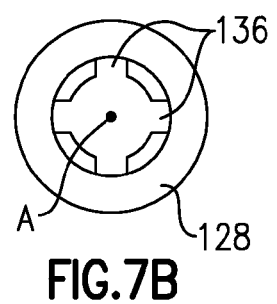
FIG.7A  FIG.7B
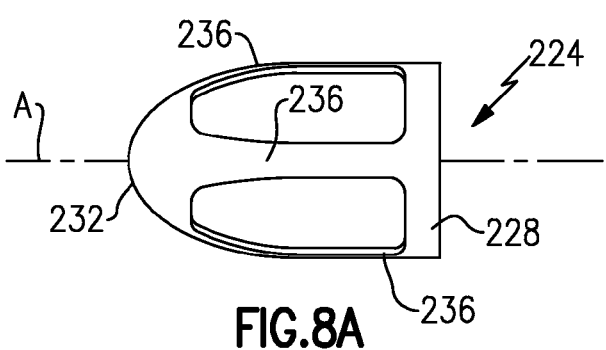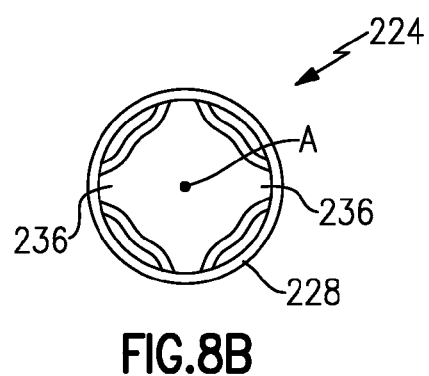
FIG.8A  FIG.8B

EXCESS FLOW VALVE WITH CAGE

BACKGROUND OF THE INVENTION

The present invention generally relates to an excess flow valve that permits fluid flow through a flow line if the flow is below a predetermined flow rate but minimizes the flow if the flow rate rises above the predetermined limit to prevent uncontrolled flow or discharge of fluids.

Excess flow valves are typically used in a capsule to facilitate its installation in various flow lines, fittings, pipe systems, appliances and the like. The excess flow valve acts in response to a high or a low differential pressure between the upstream pressure and downstream pressure of the capsule. In one known configuration, the excess flow valve is comprised of four components including a housing, a seat, a valve plate or body, and a spring or magnet to bias the valve plate. The capsule may be inserted in various flow passageways including a valve body, a connector fitting, a hose fitting, a pipe nipple, a tube, a male iron pipe (MIP), a female iron pipe (FIP), an appliance and other similar installations to provide excess flow protection.

These spring and magnet configurations can be disadvantageous from a cost and assembly perspective due to the number of components. Further, spring operated devices have a tendency to float or close gradually as the internal flow increases right up to the design limit. The tolerances on these designs can have undesirable bypass flow rates when the spring constant changes relative to temperature (primarily on polymeric springs and metal springs in extreme temperatures) and frictional resistance to closing caused by spring buckling on compression springs.

SUMMARY OF THE INVENTION

According to one exemplary embodiment, an assembly for limiting excess flow includes a housing having an internal bore that defines a seat. A cage is positioned within the internal bore and includes an upstream end and a sealing surface at a downstream end. A back plate with at least one magnet is seated within the internal bore upstream of the cage. The cage moves away from the back plate when a predetermined flow condition is exceeded such that the sealing surface engages the seat.

In another embodiment according to the previous embodiment, the cage includes at least one opening from an exterior surface into an interior of the cage.

In another embodiment according to any of the previous embodiments, the sealing surface comprises a curved sealing surface.

In another embodiment according to any of the previous embodiments, the cage defines a central axis extending in a direction of flow through the housing, and wherein the cage includes a plurality of legs extending from the upstream end to the downstream end and which are circumferentially spaced apart from each other about the axis to provide a plurality of openings into the interior of the cage.

In another embodiment according to any of the previous embodiments, the upstream end of the cage includes an open end that is in fluid communication with the plurality of openings, and wherein the downstream end comprises a closed end.

In another embodiment according to any of the previous embodiments, when flow does not exceed the predetermined flow condition, fluid flows through the open end of the cage, through the plurality of openings, and then flows radially outward and around the curved sealing surface to exit a downstream end of the housing.

In another embodiment according to any of the previous embodiments, the back plate comprises a ring-shaped component having a radially outer surface in engagement with the internal bore and a radially inner surface with upstream and downstream end faces extending between the radially outer and inner surfaces. One of the upstream and downstream end faces includes an orifice that receives the magnet.

In another embodiment according to any of the previous embodiments, wherein the cage has an outermost diameter, and wherein the cage is defined by a length extending from the upstream end to the downstream end, and wherein a ratio of the length to the outermost diameter is greater than 1:1. In one example, the ratio is at least 1.6:1.

In another embodiment according to any of the previous embodiments, the cage is comprised of a polymeric material. In one example, the polymeric material includes a predetermined amount of ferromagnetic material.

In another embodiment according to any of the previous embodiments, the seat of the housing has a shape that is different than the curved sealing surface to create a ring of point contact between the curved sealing surface and the seat.

In another embodiment according to any of the previous embodiments, the housing comprises one of a fitting, tube, connector, cartridge, male pipe, or female pipe.

According to another exemplary embodiment, a method of assembling an excess flow valve includes providing a housing, a cage, and a back plate with an orifice for a magnet as described in any of the embodiments set forth above, and inserting the back plate with the magnet and the cage into the internal bore such that the back plate is held fixed relative to the housing, and the cage is capable of moving away from the back plate when a predetermined flow condition is exceeded such that the sealing surface can engage the valve seat.

In another embodiment according to any of the previous embodiments, the back plate and cage are installed into the housing through an upstream end.

In another embodiment according to any of the previous embodiments, the housing with the back plate and cage are installed as an assembly into a downstream end of a secondary housing.

These and other features of the present invention can be best understood from the following specification and drawings, the following of which is a brief description.

BRIEF DESCRIPTION OF THE DRAWINGS

FIG. 2A shows a side view of the valve of FIG. 2.

FIG. 2B sows and end view of the valve of FIG. 2.

FIG. 7A shows a side view of another example of a valve.

FIG. 7B sows and end view of the valve of FIG. 7A.

FIG. 8A shows a side view of another example of a valve.

FIG. 8B sows and end view of the valve of FIG. 8A.

DETAILED DESCRIPTION OF THE PREFERRED EMBODIMENT

Figure 1:
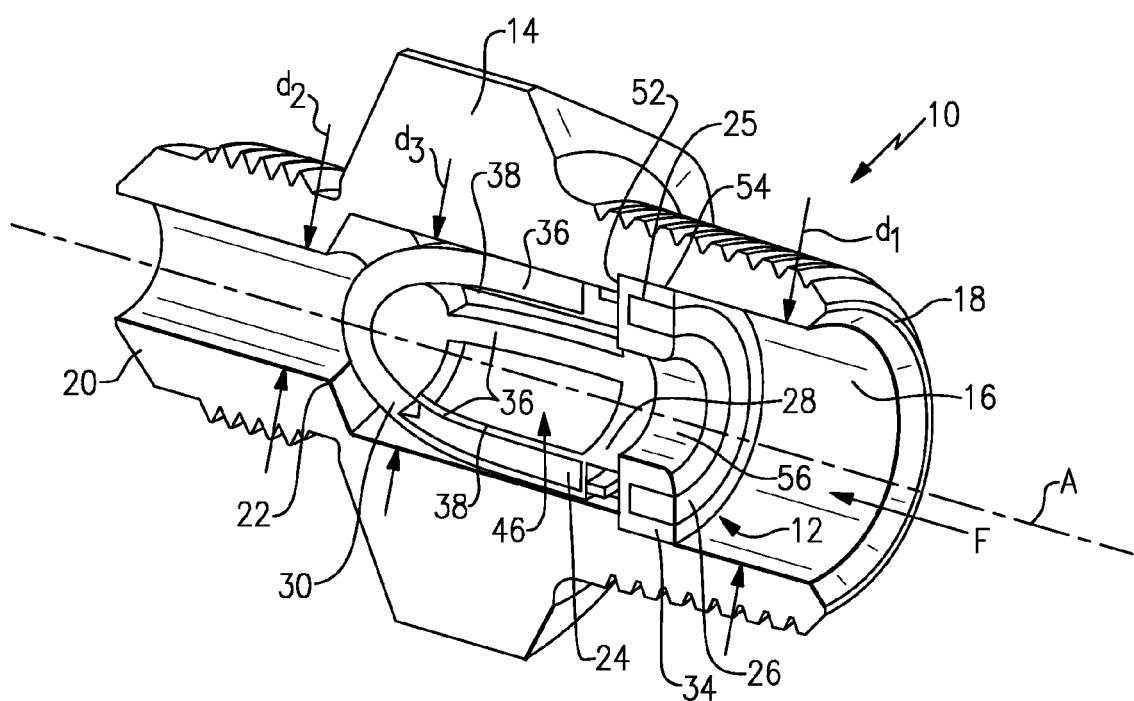
FIG. 1 shows an excess flow valve in a fitting.

FIG. 1 shows a fitting 10 and an excess flow valve 12. The fitting 10 can carry different fluids, such as natural gas, or other gases or liquids for example. In one example configuration, the fitting 10 is configured to couple a fluid supply line to an appliance (not shown).

The fitting 10 includes a housing 14 having an internal bore 16 extending from an upstream end 18 to a downstream end 20. The bore 16 provides a seat 22 for the valve 12 during an excess flow condition. The internal bore 16 is defined by at least two inner diameters. There is at least an upstream inner diameter d1 and a downstream inner diameter d2. The upstream inner diameter d1 is greater than the downstream inner diameter d2. The bore 16 also includes a third inner diameter d3 that is positioned axially between the upstream inner diameter d1 and the downstream inner diameter d2.

Figure 2:
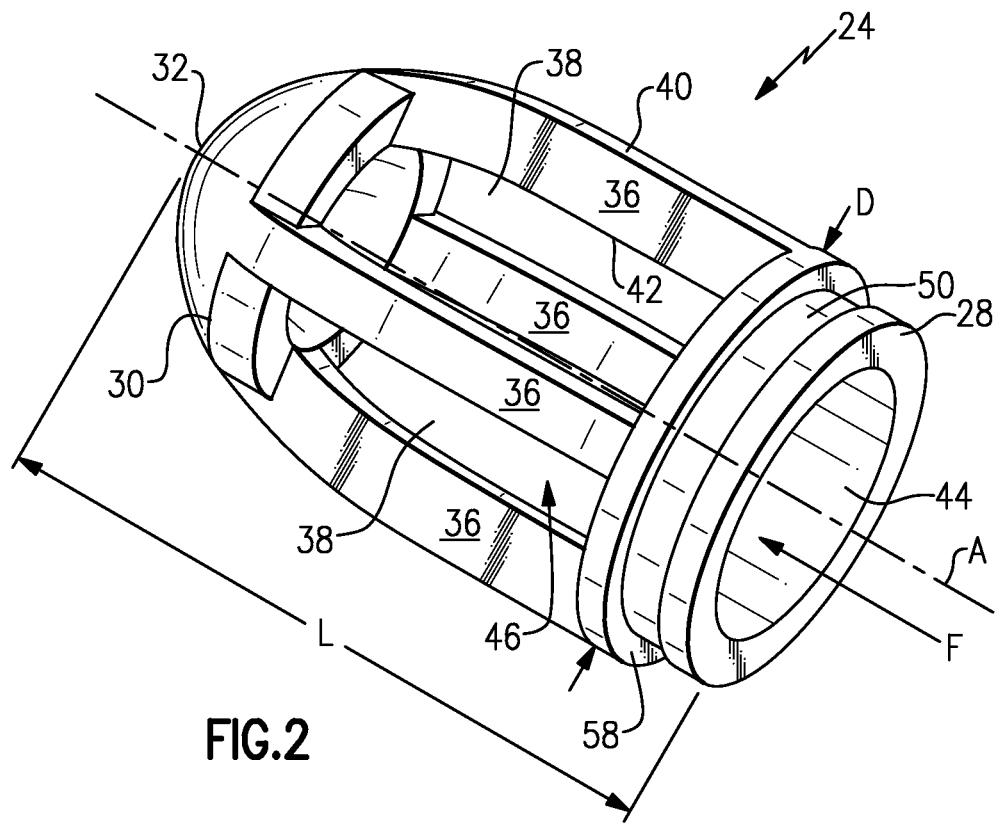
FIG. 2 is a perspective view of the excess flow valve of FIG. 1.

A shuttle or cage 24 is positioned within the internal bore 16 at the third inner diameter d3. A magnet 26 is received within an orifice 25 formed in a back plate 34 that is positioned upstream of end 28 of the cage 24. The cage 24 includes a downstream end 30 that provides a sealing surface 32 (FIG. 2). In one example, the sealing surface 32 comprises a curved sealing surface.

The back plate 34 with the magnet 26 is seated within the internal bore 16 upstream of the cage 24. The cage 24 is configured to move away from the back plate 34 and magnet 26 when a predetermined flow condition is exceeded such that the curved sealing surface 32 engages the seat 22. This will be discussed in greater detail below.

The housing 14 defines a central axis A that is concentric with a central axis of the cage 24 and which extends in a direction of flow F through the housing 14. The cage 24 includes at least one opening 38 into an interior of the cage 24. In one example, the cage 24 includes a plurality of ribs or legs 36 that extend from the upstream end 28 to the downstream end 30. The legs 36 are circumferentially spaced apart from each other about the axis A to provide a plurality of openings 38, and are configured to hold the valve 12 concentrically within the housing 14. In one example, the legs 36 are equally spaced around the axis A (see FIGS. 2A-2B).

Figure 3:
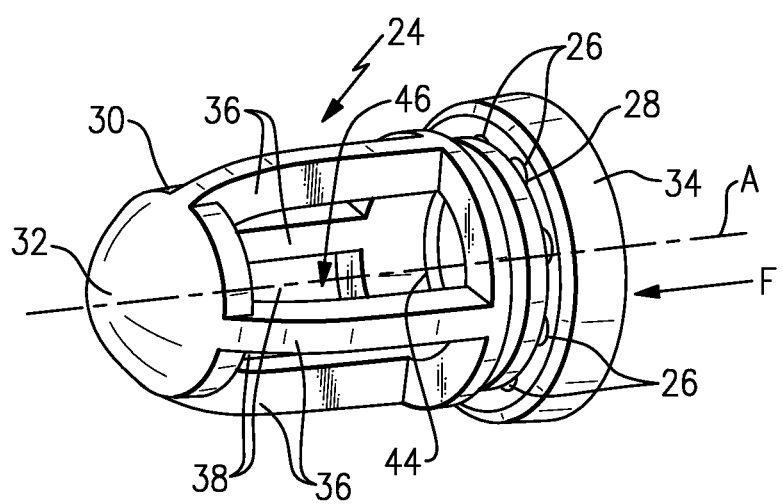
FIG. 3 is a side view of the excess flow valve of FIG. 2 with a back plate and magnet.

As shown in FIGS. 2-3, the legs 36 connect the base 26 to the curved sealing surface 32. In one example, the legs 36 are slightly curved along the direction of flow F to provide a convex radially outer surface 40 and a concave radially inner surface 42. In another example, the inner surface 42 could be straight, or have a different profile than the outer surface 40. The base 26 includes an open end 44. The open end 44 comprises an inner bore that is in fluid communication with the upstream end 18 of the housing 14. The open end 44 fluidly connects the upstream end 18 of the housing 14 to an internal cavity 46 of the cage 24. The open end 44 is in fluid communication with the plurality of openings 38 via the internal cavity 46. The downstream end 30 comprises a closed end that defines the curved sealing surface 32.

The cage 24 and legs 36 can have different shapes from that which is shown in FIGS. 2, 2A, and 2B. FIGS. 7A-7B show an example where a cage 124 has a downstream end 128 that is of a generally constant diameter. The upstream end provides a curved sealing surface 132 similar to that described above. The legs 136 are spaced about the axis A as described above.

FIGS. 8A-8B show an example where a cage 224 has a curved sealing surface 232 and an upstream end 228 having a generally constant diameter. The legs 236 have a variable thickness in a direction extending along a length of the cage 224. The legs also have a variable cross-section as shown in FIG. 8B. Each of these example embodiments operates in the manner described below.

When flow through the valve 12 does not exceed the predetermined flow condition, the fluid flows through the open end 44 of the base 26 and into the internal cavity 46. Then the fluid flows between the legs 36, through the plurality of openings 38, and then flows radially outward and around the curved sealing surface 32 to exit the downstream end 20 of the housing 14. When flow through the valve 12 exceeds the predetermined flow condition, the pressure of the flowing fluid exceeds the pull of the magnetic force and the cage 24 disengages from the back plate 34. The cage 24 moves in a downstream direction until the curved sealing surface 32 seats firmly against the seat 22. This restricts the flow without completely closing, allowing some bypass of flow from exiting the downstream end 20 of the housing 14. The cage 24 moves back into engagement with the back plate 34 when pressures upstream and downstream of the cage 24 equalize.

In one example, the upstream end 28 of the cage 24 includes a seat 50 that is configured to receive a stainless steel hoop ring (not shown) which interacts with the back plate 34 when the flow does not exceed the predetermined flow condition. In the example shown, the seat 50 comprises a reduced diameter portion of the upstream end 28 of the cage 24. A flat surface 58 extends from the outermost diameter of the cage 24 to the reduced diameter portion. The flat surface 58 is preferably perpendicular to the central axis A so that the surface 58 easily aligns with the back plate 34. The housing 14 includes an internal shoulder 52 that serves to seat the back plate 34 within the housing 14 such that the back plate 34 with the magnet 26 does not move relative to the housing 14.

In one example shown in FIG. 1, the back plate 34 comprises a ring-shaped component having a radially outer surface 54 in engagement with the internal bore 16 and a radially inner surface 56 with upstream and downstream end faces extending between the radially outer 54 and inner 56 surfaces. One of the downstream and upstream end faces includes the orifice 25 that receives the magnet 26. In the example shown in FIG. 1, a single magnet 26 is inserted in the orifice 25 on an upstream side of the back plate 34. In the example shown in FIG. 3, a plurality of miniature disc magnets 26 are received within the orifice on a downstream side of the back plate 34. In the example shown in FIG. 4, a single magnet 26 is inserted in the orifice on a downstream side of the back plate 34. Other configurations could also be used.

In one example, the downstream end face of the back plate 34 is in engagement with the end face 28 of the cage 24 when flow does not exceed the predetermined flow condition. Optionally, the fitting 10 may include a stop to hold the cage 24 from contact with the back plate 34 and magnet 26 when in an open position. While one magnet is shown, it should be understood that a plurality of magnets could be utilized to interact with the cage 24.

As shown in FIG. 2, the upstream end 28 of the cage 24 defines an outermost diameter D of the cage 24. The cage 24 is also defined by a length L extending from the upstream end 28 to the downstream end 30. The length L is greater than the diameter D to prevent binding of the cage 24 in the housing 14. A ratio of the length L to the diameter D is greater than 1:1. In one preferred example, the ratio is at least 1.6:1.

In another example, a ratio of a portion of the cage 24 that is straight versus a portion of the cage 24 that is curved is 1:1 or greater. In other words, preferably the straight portion of the cage should be the same or longer than the portion of the cage that is curved.

The cage 24 is configured to be movable in response to a magnetic force generated by the magnet 26 that is located within the orifice 25 of the back plate 34. This can be accomplished by forming the cage of various types of material and/or providing a magnetically responsive material on the cage 24.

In one example, the cage 24 is comprised of semi-magnetic material in order to limit the attractive forces to the back plate 34 and magnet 26 within the assembly and to provide some environmental corrosion protection. In one such example, the cage 24 is made from a polymeric material with a predetermined amount of ferromagnetic material as a fill material. In one example, the polymeric material includes a minimum of 5% of stainless steel fiber fill material, the grade of which can be attracted to a magnet.

In another example, the cage 24 is completely made from a polymeric material and a secondary component, such as a stainless steel hoop ring for example, is assembled on the cage 24.

In one example, the polymeric material is a material which has a low coefficient of friction and which is ideally suited for both the operating temperature range and corrosive environment as needed.

In another example, the cage 24 is made completely from a thin walled stainless steel tube with one closed end. The grade of steel is such that it is capable of being attracted to a magnet.

In order to improve the overall accuracy of the valve 12 regardless of the mounting position, the weight or mass of the cage 24 must be kept to a minimum relative to the functional requirements. In order to reduce the tolerance sensitivity at which the cage 24 separates from the back plate 34, the back plate 34 with the magnet 26 should be designed to operate in a range where the pull force relative to distance approaches a horizontal line. In one preferred example, a slope of a line tangent to the force-distance curve is less than 45 degrees.

The seat 22 of the housing 14 is configured to have a shape that is different than the curved sealing surface 32 of the cage 24 to create a ring of point contact between the curved sealing surface 32 and the seat 22. In one example, the nose, i.e. the closed downstream end 30, of the cage 24 is elliptical in form and is larger in size than a downstream opening of the housing 14. The shape of the seat 22 is therefore configured to have a shape that does not match the shape of the nose.

As shown in FIG. 1, the internal bore 16 is defined by at least two inner diameters. There is at least an upstream inner diameter d1 that seats the back plate 34 and a downstream inner diameter d2 that defines the seat 22 for the cage 24. The upstream inner diameter d1 is greater than the downstream inner diameter d2. The bore 16 also includes the third inner diameter d3 that is positioned axially between the upstream inner diameter d1 and the downstream inner diameter d2. The third inner diameter d3 defines a portion of the housing 14 within which the cage 24 shuttles back and forth based on the flow condition. The third inner diameter d3 is less that the upstream inner diameter d1 and greater than the downstream inner diameter d2.

Figure 4:
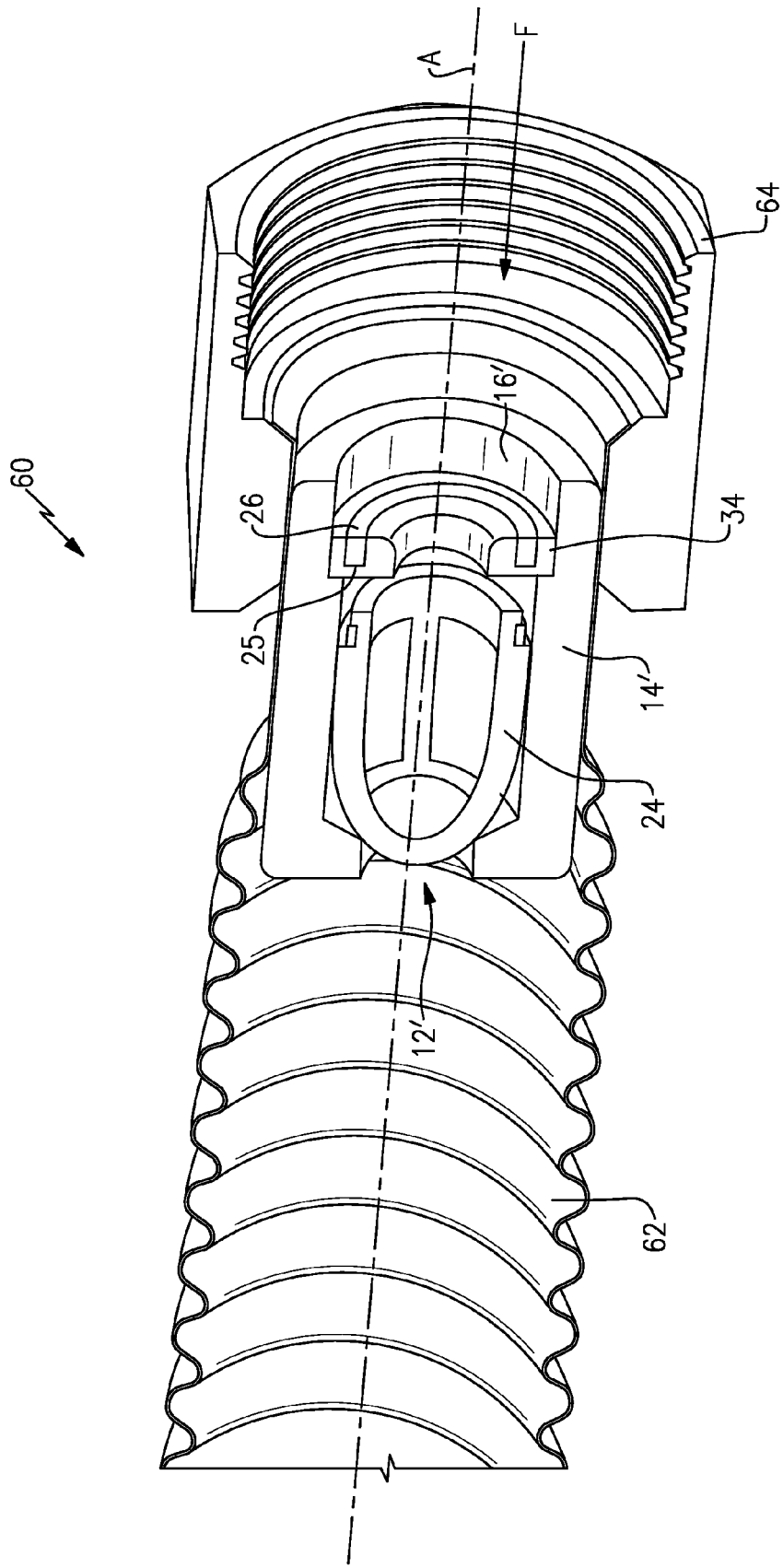
FIG. 4 shows the excess flow valve of FIG. 3 in a flexible connector.

In the example shown in FIG. 1, the excess flow valve 12 is loaded into a fitting 10. However, the valve 12' could also be loaded into a flexible connector 60 as shown in FIG. 4. In this example, the housing that receives the valve 12 comprises a tube 14'. The tube 14' connects a flexible tube portion 62 to a rigid connector 64. The cage 24 and back plate 34 with the magnet 26 are formed as described above. Further, the internal bore 16' of the tube 14' is similarly profiled to that described above.

Thus, the structure that receives the cage 24 and magnet comprises a housing that can be a fitting, tube, connector, cartridge, male pipe, female pipe, etc.

A method of assembling an excess flow valve 12 includes providing a housing 14, a cage 24, and a back plate 34 with a magnet 26 as described in any of the embodiments set forth above, and inserting the back plate 34 with the magnet 26 and the cage 24 into the internal bore 16 such that the back plate 34 is held fixed relative to the housing 14 and the cage 24 is capable of moving away from the back plate 34 when a predetermined flow condition is exceeded such that the curved sealing surface 32 can engage the valve seat 22.

In one example, the back plate 34 and cage 24 are installed into the housing through the upstream end 18 as shown in FIGS. 1-4.

Figure 5:
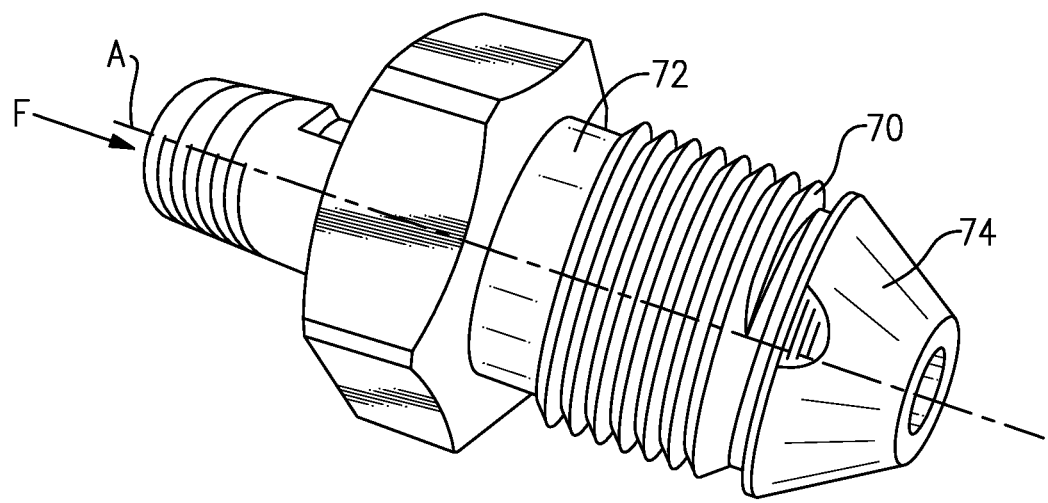
FIG. 5 shows an excess flow valve assembled from a downstream direction toward an upstream direction within a housing.
Figure 6:
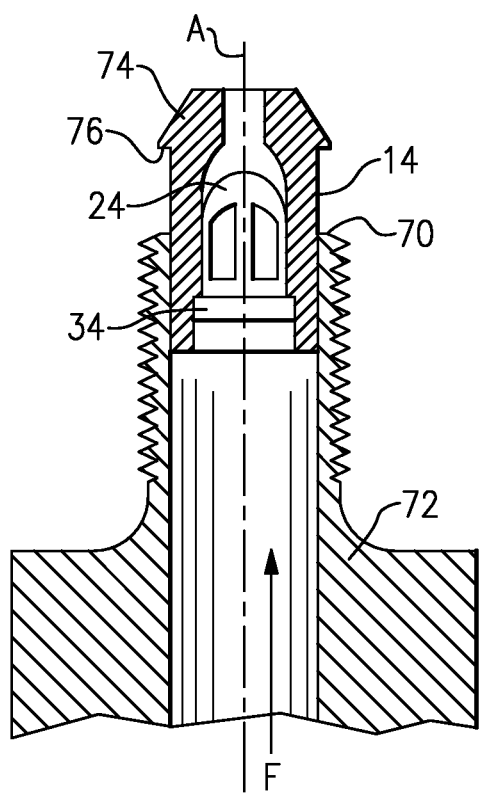
FIG. 6 is a cross-sectional view of FIG. 5.

In another example, the back plate 34 and cage 24 in the housing 14 are installed as an assembly into a downstream end 70 of a secondary housing 72 as shown in FIGS. 5-6. In this example, the housing 14 includes an increased diameter portion 74 defining an abutment surface 76 that seats against the downstream end 70 of the secondary housing 72 as shown in FIG. 5.

The subject invention offers several advantages over prior designs. The subject invention offers a reduction in components as compared to a four-piece configuration (eliminating a brass fitting, a brass seat, a plate and replacing a plastic housing, for example), resulting in a lower overall cost. Further, the subject invention provides an end-loading magnetic excess flow valve where the components are assembled from the upstream side toward the downstream side of the valve allowing fewer parts as noted above and allowing for an automated assembly processes in manufacturing. As discussed above, components of this valve 12 can be easily loaded into various different components such as a fitting, a flexible connector (in tube cavity/in connector), a cartridge, etc., or the components can be directly loaded into a male or female pipe, for example.

To allow for bind free movement of the cage 24 within the fitting or housing 14 relative to the direction of flow, the geometry of the cage is such that the length L is greater than the diameter D. Further, the end of the cage 24 is elliptical in form which allows for easy alignment during assembly and provides a face to seal off the flow of the fluid within the line during an excess flow condition.

Further, in order to minimize manufacturing cost, the valve components are configured and positioned within the housing in such a way that the flow of gas or fluid through the assembly at any given point does not exceed the overall flow capacity of the valve by a significant margin. This approach places the flow control on the back plate with the orifice inner diameter at the upstream end of the valve. It also minimizes the size, strength or number of magnets required to auto-reset the valve after an excess flow condition has been repaired.

As discussed above, the subject invention may utilize a plurality of magnets. The magnets and the back plate orifice with the housing can be designed where individual magnets are inserted within a polymeric orifice design which serves to retain the orifice assembly within the housing and properly position the magnets.

Also, the finite ring of contact between the seat and the curved sealing surface could also be made from a resilient material for a version of the valve that allows no bypass flow.

The preceding description is exemplary rather than limiting in nature. Variations and modifications to the disclosed examples may become apparent to those skilled in the art that do not necessarily depart from the essence of this disclosure.

The scope of legal protection given to this disclosure can only be determined by studying the following claims.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

What is claimed is:

1. An assembly for limiting excess flow comprising:
   a housing having an internal bore defining a seat;
   a cage positioned within the internal bore, the cage having an upstream end and a downstream end providing a sealing surface; and
   at least one back plate with a magnet, the back plate being seated within the internal bore upstream of the cage, wherein the cage moves away from the back plate when a predetermined flow condition is exceeded such that the sealing surface engages the seat.

2. The assembly of claim 1 wherein the cage includes at least one opening from an exterior surface into an interior of the cage.

3. The assembly of claim 1 wherein the sealing surface comprises a curved sealing surface.

4. The assembly of claim 1 wherein the cage defines a central axis extending in a direction of flow through the housing, and wherein the cage includes a plurality of legs extending from the upstream end to the downstream end and which are circumferentially spaced apart from each other about the axis to provide a plurality of openings.

5. The assembly of claim 4 wherein the legs are curved to provide a convex radially outer surface.

6. The assembly of claim 4 wherein the upstream end comprises an open end that is in fluid communication with the plurality of openings, and wherein the downstream end comprises a closed end.

7. The assembly of claim 6 wherein when flow does not exceed the predetermined flow condition, fluid flows through the open end of the upstream end of the cage, through the plurality of openings, and then flows radially outward and around the sealing surface to exit a downstream end of the housing.

8. The assembly of claim 4 wherein the upstream end of the cage includes an abutment surface that is attracted to the magnet.

9. The assembly of claim 8 wherein the back plate is held fixed to the housing and comprises a ring-shaped component having a radially outer surface in engagement with the internal bore and a radially inner surface with upstream and downstream end faces extending between the radially outer and inner surfaces, and wherein one of the upstream and downstream end faces includes an orifice that receives the magnet.

10. The assembly of claim 2 wherein the cage has an outermost diameter, and wherein the cage is defined by a length extending from the upstream end to the downstream end, and wherein a ratio of the length to the outermost diameter is greater than 1:1.

11. The assembly of claim 10 wherein the ratio is at least 1.6:1.

12. The assembly of claim 2 wherein the cage is comprised of a polymeric material.

13. The assembly of claim 12 wherein the polymeric material includes a predetermined amount of ferromagnetic material.

14. The assembly of claim 2 wherein the seat of the housing has a shape that is different than the sealing surface to create a ring of point contact between the sealing surface and the seat.

15. The assembly of claim 1 wherein the housing comprises one of a fitting, tube, connector, cartridge, male pipe, or female pipe.

16. The assembly of claim 1 wherein the internal bore is defined by at least two inner diameters comprising at least an upstream inner diameter that seats the back plate and a downstream inner diameter that seats the cage, wherein the upstream diameter is greater than the downstream diameter.

17. The assembly of claim 1 wherein the cage moves toward the back plate with the magnet when pressures upstream and downstream of the cage equalize.

18. A method of assembling an excess flow valve comprising:
   providing a housing having an internal bore defining a central axis and extending from an upstream end to a downstream end, the internal bore including a valve seat;
   providing a cage having an upstream end and a sealing surface at a downstream end, and wherein the cage includes at least one opening from an exterior surface into an interior of the cage; and
   inserting a back plate with at least one magnet and the cage into the internal bore such that the back plate is held fixed relative to the housing and the cage is capable of moving away from the back plate when a predetermined flow condition is exceeded such that the sealing surface can engage the valve seat.

19. The method of claim 18 wherein the back plate and cage are installed into the housing through the upstream end.

20. The method of claim 19 wherein the housing is inserted into a downstream end of a secondary housing.

21. The method of claim 18 wherein the back plate includes an upstream end face and a downstream end face, and wherein one of the upstream and downstream end faces includes at least one orifice that receives the magnet.

22. The method of claim 18 wherein the magnet is radially spaced apart from the central axis such that fluid flows through a center opening in the back plate and magnet during normal flow conditions when the predetermined flow condition is not exceeded.

23. The method of claim 18 wherein the valve seat of the housing has a shape that is different than the sealing surface to create a ring of point contact between the sealing surface and the valve seat.

24. The method of claim 18 wherein the cage is comprised of a polymeric material that includes a predetermined amount of ferromagnetic material that is attracted to the magnet.

25. The assembly of claim 1 wherein the back plate includes an upstream end face and a downstream end face, and wherein one of the upstream and downstream end faces includes at least one orifice that receives the magnet.

26. The assembly of claim 1 wherein the magnet is radially spaced apart from a central axis defined by the bore such that fluid flows through a center opening in the back plate and magnet during normal flow conditions when the predetermined flow condition is not exceeded.

* * * * *